US012420318B2

(12) United States Patent
Simpfendorfer et al.

(10) Patent No.: US 12,420,318 B2
(45) Date of Patent: Sep. 23, 2025

(54) CLEANING NOZZLE FOR CLEANING PIPES

(71) Applicant: USB-USA, LLC, Douglasville, GA (US)

(72) Inventors: Uli Simpfendorfer, Douglasville, GA (US); Simon Simpfendorfer, Douglasville, GA (US); Martin Hurlebaus, Douglasville, GA (US)

(73) Assignee: USB-USA, LLC, Douglasville, GA (US)

( * ) Notice: Subject to any disclaimer, the term of this patent is extended or adjusted under 35 U.S.C. 154(b) by 475 days.

(21) Appl. No.: 17/825,670

(22) Filed: May 26, 2022

(65) Prior Publication Data

US 2023/0062905 A1 Mar. 2, 2023

Related U.S. Application Data

(60) Provisional application No. 63/236,771, filed on Aug. 25, 2021.

(51) Int. Cl.
*B08B 9/049* (2006.01)
*B05B 1/14* (2006.01)

(52) U.S. Cl.
CPC .............. *B08B 9/0495* (2013.01); *B05B 1/14* (2013.01)

(58) Field of Classification Search
None
See application file for complete search history.

(56) References Cited

U.S. PATENT DOCUMENTS

2008/0035184 A1 * 2/2008 Wagner .................. B05B 3/026 134/112

* cited by examiner

*Primary Examiner* — Cristi J Tate-Sims
(74) *Attorney, Agent, or Firm* — SMITH TEMPEL; Steven P. Wigmore

(57) ABSTRACT

A nozzle is provided for cleaning the interior of pipes that is capable of cutting through obstructions disposed in the interior of pipes. The nozzle comprises a three-dimensional (3-D) fluid mechanics comprising a 3-D redirection configuration that redirects high-pressure fluid received in the nozzle from a fluid source onto multiple pathways, or channels, toward rearwardly-facing jet outlets. The 3-D fluid redirection configuration redirects the water in a manner that reduces or eliminates vibrations in the nozzle that can degrade performance and cause other problems.

6 Claims, 3 Drawing Sheets

CLEANING NOZZLE FOR CLEANING PIPES

CROSS-REFERENCE TO RELATED APPLICATIONS

This application is a nonprovisional application that claims priority to and the benefit of the filing date of a U.S. provisional application having application Ser. No. 63/236,771, filed on Aug. 25, 2021, entitled "A ROOT CUTTER NOZZLE FOR CLEANING THE INSIDES OF PIPES," which is hereby incorporated by reference herein in its entirety.

TECHNICAL FIELD

The invention relates to cleaning nozzles for cleaning pipes, and, more particularly, to a cleaning nozzle comprising a rotating head having a three-dimensional (3-D) fluid redirection configuration.

BACKGROUND

Sewer pipes transport liquid and solid waste materials from residential, industrial, commercial and other waste producers. Sewer pipes can become clogged from the infiltration of various materials into the interior space of the pipes, such as sand, greasy materials, stones, tree roots, and buildup of other materials that settle out of the waste stream.

Cleaning nozzles suited for cleaning sewers or pipes, which do not provide easy access to cleaning personnel due to their small cross-sections, with the aid of high-pressure water jets are known. The known cleaning systems are provided, on one end of a cleaning hose, with a cleaning nozzle the exact mechanical properties of which depend on the particular cleaning purpose. It is, however, a general feature of such cleaning nozzles that the pressurized water is ejected through specifically arranged and, in some cases, specifically designed nozzle orifices, or outlets.

In order to permit an inner pipe wall to be cleaned throughout, the above-mentioned cleaning nozzles are often mounted to rotate on the pressure hose. By arranging one or more nozzle orifices obliquely in the circumferential area of the cleaning nozzle, a torque is produced by the jet pressure, based on the "principle of repulsion", that causes the cleaning nozzle, or a corresponding nozzle head, to rotate. A cleaning nozzle of this kind is disclosed in, for example, EP 0 645 191 A2 and comprises a housing in which a turbine is arranged in the flow path of the pressurized water flowing through the housing. The turbine is mounted on a shaft, and a nozzle head is seated on the one shaft end that projects from the housing.

It is known to use such nozzles as root cutters with forward- and rearward-facing water jet outlets to clean sewer pipes. Water under high pressure (e.g., 2000 pounds per square inch (psi)), exits the forward- and rearward-facing water jet outlets to propel the cleaning head forward while breaking up obstructions in the pipe and washing solid material from the walls of the pipe. Examples of such nozzles are disclosed in: U.S. Pat. No. 5,341,539, entitled "Apparatus for Cleaning Waste Collection System," which issued Aug. 30, 1994; U.S. Pat. No. 5,336,333, entitled "Method for Cleaning Waste Collection Systems" issued Aug. 9, 1994; U.S. Pat. No. 5,129,957, entitled "Method for Cleaning Sewers," which issued Jul. 14, 1992; and U.S. Pat. No. 5,068,940, entitled "Apparatus for Cleaning Sewers," which issued Dec. 3, 1991.

While such nozzles generally work well, creating the rearward-facing water jets requires providing fluid redirecting mechanisms in the nozzle that redirect the high-pressure water received in the nozzle from a water hose onto multiple pathways toward the rearward-facing jet outlets. Redirecting the water in this manner can lead to vibrations in the nozzle that can degrade performance and cause other problems. Accordingly, a need exists for a cleaning nozzle that overcomes such problems.

SUMMARY

A nozzle for cleaning pipes is provided comprising a nozzle body, a nozzle head and three-dimensional (3-D) fluid mechanics. The nozzle head has first and second ends, the second end being configured to be attached to a fluid source that delivers a flow of fluid to the nozzle. The nozzle body has a main fluid channel adapted to allow fluid passing out of the fluid source to flow through the nozzle body in a forward direction of the nozzle and out of the first end of the nozzle body. The nozzle head has a first end and a second end, the first end being rotatably coupled with the first end of the nozzle body via a rotational coupling configuration. The nozzle head has a plurality of fluid channels and a plurality of respective fluid jet outlets disposed therein. N of the fluid channels and N of the fluid jet outlets are rearwardly-facing fluid channels and rearwardly-facing fluid jet outlets, respectively, where N is a positive integer that is greater than or equal to one.

A main fluid channel of the nozzle head is arranged in the nozzle head such that fluid passing out of the first end of the nozzle body enters the main fluid channel of the nozzle head, flows in the forward direction of the nozzle toward the second end of the nozzle head and passes out of a second end of the main fluid channel of the nozzle head. The 3-D fluid mechanics disposed in the nozzle head are configured to receive fluid passing out of the second end of the main fluid channel of the nozzle head and to direct the received fluid onto the fluid channels toward the respective fluid jet outlets. The 3-D fluid mechanics comprise a 3-D fluid redirection configuration comprising N fluid diversion chambers upon which at least a portion of the fluid received by the 3-D fluid mechanics is incident. The N fluid diversion chambers are configured to redirect the fluid that is incident thereon onto the N rearwardly-facing fluid channels toward the N rearwardly-facing fluid jet outlets, respectively, to generate N rearwardly-directed fluid jets, respectively.

In accordance with a representative embodiment, each of the N fluid diversion chambers comprises a respective rounded feature.

In accordance with a representative embodiment, each of the rounded features is curved in three dimensions.

In accordance with a representative embodiment, each of the rounded features is a partial sphere.

In accordance with a representative embodiment, each of the rounded features is aspherical in shape.

In accordance with a representative embodiment, the plurality of fluid channels and the plurality of respective fluid jet outlets further comprise at least one forwardly-facing fluid channel and at least one forwardly-facing jet outlet, respectively. At least a portion of the fluid received by the 3-D fluid mechanics is directed by the 3-D fluid mechanics onto the forwardly-facing fluid channel toward the respective forwardly-facing fluid jet outlet to generate a respective forwardly-directed fluid jet.

In accordance with a representative embodiment, the nozzle head comprises two main piece parts that are interlocked with one another to form the nozzle head. The main fluid channel of the nozzle head extends through the first piece part, which comprises the first end of the nozzle head that is coupled with the first end of the nozzle body. The N rounded features are disposed in the second piece part.

In accordance with a representative embodiment, N is greater than or equal to four such that at least four rearwardly-directed fluid jets and at least one forwardly-directed fluid jet are generated.

In accordance with a representative embodiment, a method is provided for cleaning pipes. The method comprises:

- with a nozzle positioned within a pipe to be cleaned and having a fluid source attached to a second end of a body of the nozzle, causing fluid delivered from the fluid source to flow through a main fluid channel of the nozzle body in a forward direction of the nozzle and to pass out of a first end of the nozzle body;
- with 3-D fluid mechanics disposed in the nozzle head, receiving the fluid passing out of a second end of the main fluid channel of the nozzle head; and
- with a 3-D fluid redirection configuration of the 3-D fluid mechanics, receiving at least a portion of the fluid received by the 3-D fluid mechanics such that the fluid received by the 3-D redirection configuration is incident on N fluid diversion chambers of the 3-D fluid redirection configuration, which redirect the fluid that is incident thereon onto the N rearwardly-facing fluid channels toward the N rearwardly-facing fluid jet outlets, respectively, to generate N rearwardly-directed fluid jets, respectively.

In accordance with a representative embodiment of the method, each of the N fluid diversion chambers comprises a respective rounded feature.

In accordance with a representative embodiment of the method, each of the rounded features is curved in three dimensions.

In accordance with a representative embodiment of the method, each of the rounded features is a partial sphere.

In accordance with a representative embodiment of the method, each of the rounded features is aspherical in shape.

In accordance with a representative embodiment of the method, the plurality of fluid channels and said plurality of respective fluid jet outlets further comprise at least one forwardly-facing fluid channel and at least one forwardly-facing jet outlet, respectively, and the method further comprises:

with the 3-D fluid mechanics, directing at least a portion of the fluid received by the 3-D fluid mechanics onto the forwardly-facing fluid channel toward the respective forwardly-facing fluid jet outlet to generate a respective forwardly-directed fluid jet.

In accordance with a representative embodiment of the method, the nozzle head comprises two main piece parts that are interlocked with one another to form the nozzle head. The main fluid channel of the nozzle head extends through the first piece part, which comprises the first end of the nozzle head that is coupled with the first end of the nozzle body. The N rounded features are disposed in the second piece part.

In accordance with a representative embodiment of the method, N is greater than or equal to four such that at least four rearwardly-directed fluid jets and at least one forwardly-directed fluid jet are generated.

These and other features and advantages will become apparent from the following description, drawings and claims.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

Figure 1:
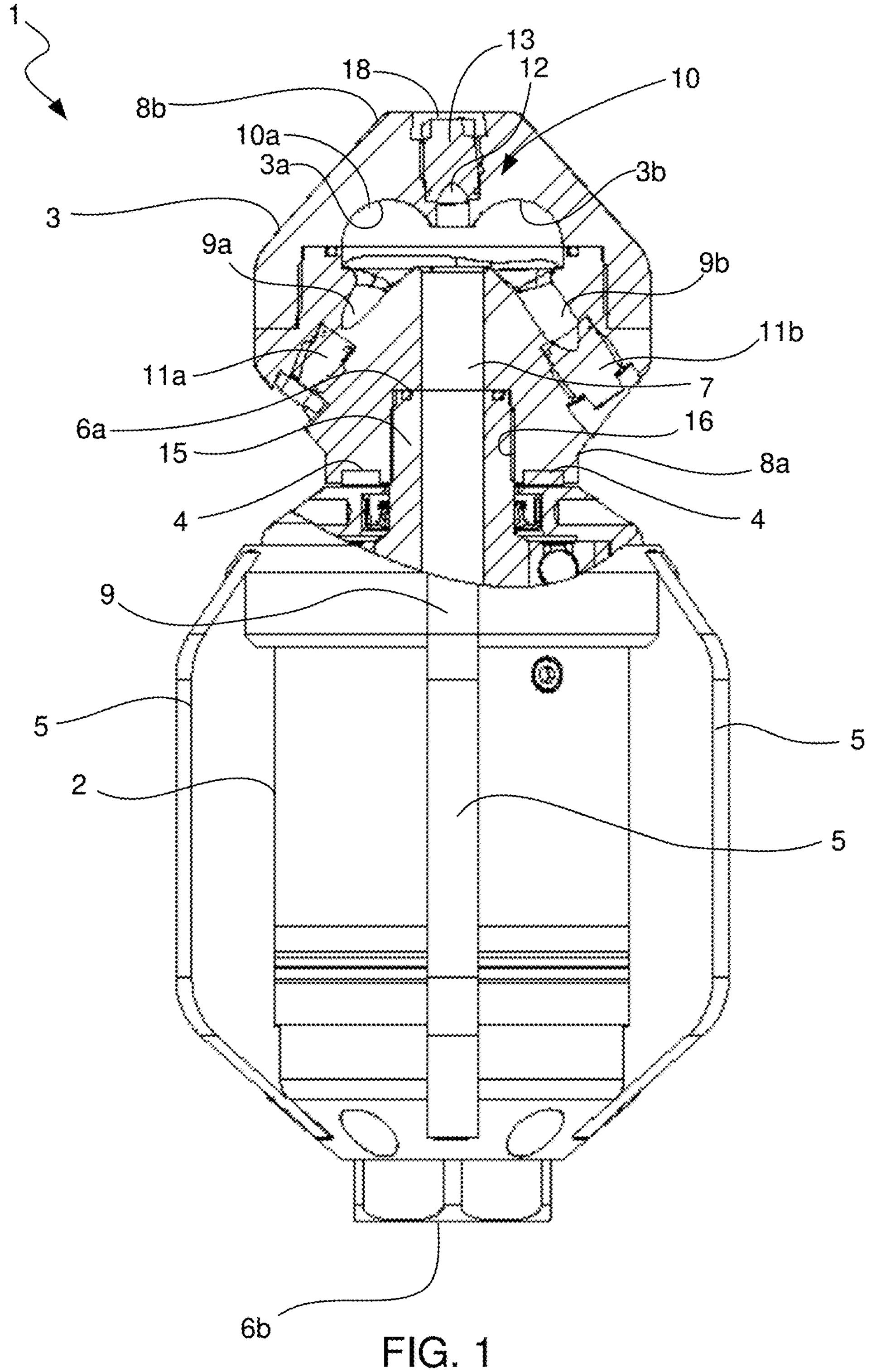
FIG. 1 shows a side perspective view of the nozzle in accordance with a representative embodiment with the head of the nozzle shown in partial cross-section to allow a three-dimensional (3-D) fluid redirection configuration disposed in the head to be seen.

The present disclosure discloses a cleaning nozzle comprising a rotating head comprising three-dimensional (3-D) fluid mechanics that include a 3-D fluid redirection configuration that redirects high-pressure fluid received in the nozzle from a water hose onto multiple pathways, or channels, toward rearwardly-facing jet outlets. The 3-D fluid redirection configuration redirects the water in a manner that reduces or eliminates vibrations in the nozzle that can degrade performance and cause other problems. The cleaning nozzle is particularly well suited for use as a root cutter because of its ability to meet the challenges that are normally confronted by root cutter nozzles. It should be noted, however, that the inventive principles and concepts of the present disclosure are not limited to root cutter nozzles, but apply to any type of cleaning nozzle that can benefit from the inventive principles and concepts disclosed herein.

In the following detailed description, a few exemplary, or representative, embodiments are described to demonstrate the inventive principles and concepts. For purposes of explanation and not limitation, the representative embodiments disclose specific details in order to provide a thorough understanding of an embodiment according to the present disclosure. However, it will be understood to one having ordinary skill in the art, and having the benefit of the present disclosure, that other embodiments that depart from the specific details disclosed herein remain within the scope of the appended claims. Moreover, descriptions of well-known apparatuses and methods may be omitted to avoid obscuring the description of the representative embodiments. Such methods and apparatuses are within the scope of the present disclosure, as will be understood by those of skill in the art in view of the present disclosure.

Terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms, such as forwardly-facing, rearwardly facing, front, back, for example, may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" another element, it can be directly connected or coupled, or intervening elements may be present.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

FIG. 1 shows is a side perspective view of the nozzle 1 in accordance with a representative embodiment with the head 3 of the cleaning nozzle 1 shown in partial cross-section to allow the 3-D fluid redirection configuration 10*a* disposed in the head 3 to be seen. The head 3 is rotatably coupled to a first end 6*a* of a body 2 of the nozzle 1 via a rotational coupling configuration, preferably a ball bearing coupling configuration, to allow the head to rotate relative to the body 2 based on the aforementioned "principle of repulsion". A variety of rotational coupling configurations can be used for this purpose, as will be understood by persons of skill in the art in view of the description provided herein. A second end 6*b* of the nozzle body 2 is adapted to connect with an end of a hose (not shown) that carries a high-pressure flow of fluid (e.g., water). The nozzle body 2 can have rails 5 secured thereto for allowing a user to carry the nozzle 1 and to protect the body 2 of the nozzle 1 during use.

A main fluid channel that is typically coaxial with a shaft 15 of the body 2 extends through the body 2 from the second end 6*b* of the body 2 to the first end 6*a* of the body 2. The shaft 15 and the main fluid channel of the body 2 are typically coaxial with a central axis of the body 2. A main fluid channel 7 of the head 3 is typically at least substantially coaxially aligned with the main fluid channel of the body 2 and extends from a first end 8*a* of the head 3 to the 3-D fluid mechanics 10 of the head 3. Fluid flowing through the main fluid channel of the nozzle body 2 in a forward direction of the nozzle 1 flows into the main fluid channel 7 of the nozzle head 2 and flows through the main fluid channel 7 of the head 3. In accordance with a representative embodiment, the 3-D fluid mechanics 10 that receive fluid flowing out of the main fluid channel 7 of the nozzle head 3 in the forward direction of the nozzle 1. The 3-D fluid mechanics 10 comprise a 3-D fluid redirection configuration 10*a*, multiple rearwardly-facing fluid channels 9*a*, 9*b*, multiple rearwardly-facing fluid outlets 11*a*, 11*b*, at least one forwardly-facing fluid channel 12, and at least one forwardly-facing fluid outlets 13.

The 3-D fluid redirection configuration 10*a* redirects the fluid passing out of the main fluid channel 7 in the forward direction of the nozzle 1 onto the multiple rearwardly-facing fluid channels 9*a*, 9*b* toward the multiple respective rearwardly-facing fluid outlets 11*a*, 11*b* to generate multiple respective rearwardly-directed fluid jets. These rearwardly-directed fluid jets cause the head 3 to rotate relative to the nozzle body 2 about a central axis of the nozzle 1 based on the aforementioned "principle of repulsion". In accordance with this representative embodiment, the 3-D fluid redirection configuration 10*a* comprises four fluid diversion chambers 3*a*-3*d*, four respective rearwardly-facing fluid channels 9*a*-9*d* for directing fluid toward four respective rearwardly-facing jet outlets 11*a*-11*d* to generate four respective rearwardly-directed fluid jets.

For ease of illustration only two fluid diversion chambers 3*a* and 3*b*, two rearwardly-facing fluid channels 9*a* and 9*b* and two rearwardly-facing fluid jet outlets 11*a* and 11*b* are shown in FIG. 1. It should be noted that the inventive principles and concepts are not limited with respect to the number of fluid diversion chambers, fluid channels and/or fluid jet outlets that are disposed in the head 3. There are typically N fluid diversion chambers, N rearwardly-facing fluid channels and N rearwardly-facing fluid jet outlets for generating N rearwardly-directed fluid jets, respectively, where N is a positive integer that is greater than or equal to one. There is typically at least one forwardly-facing fluid channels and one respective forwardly-facing fluid jet outlet for generating one respective forwardly-directed fluid jet.

In accordance with this representative embodiment, the head 3 has one forwardly-facing jet outlet 13 and one respective forwardly-facing fluid channel 12, although the head 3 can have any number of forwardly-facing jet outlets and respective forwardly-facing fluid channels. A portion of the fluid carried along the main fluid channel 7 of the head 3 flows into the forwardly-facing fluid channel 12 and is coupled out of the head 3 in the forward direction through a threaded insert 18 that is removably secured to the forwardly-facing jet outlet 13. In accordance with this representative embodiment, the jet outlets 11*a*-11*d* are also configured to receive removable threaded inserts similar or identical to insert 18 that can be swapped out with other threaded inserts with different inner diameters and/or shapes to adjust the diameters and/or shapes of the respective jets.

Figure 2:
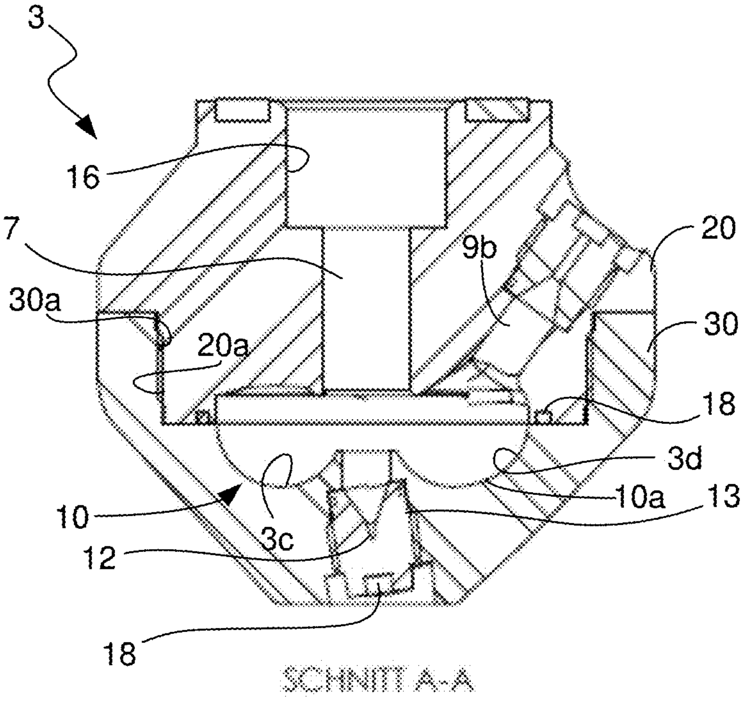
FIG. 2 shows a side cross-sectional view of the head of the nozzle shown in FIG. 1 in accordance with a representative embodiment, with the cross-section being taken along line A-A shown in FIG. 3.
Figure 3:
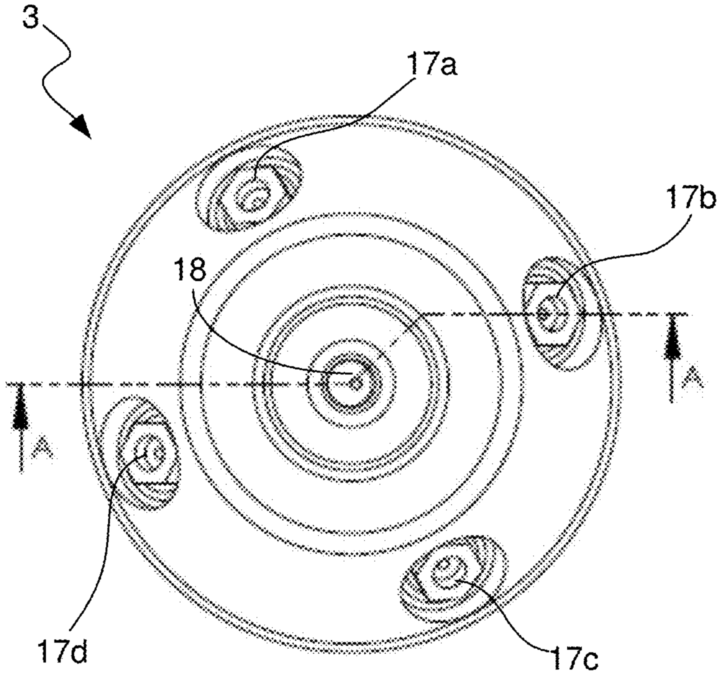
FIG. 3 shows a rear perspective view of the head of the nozzle shown in FIG. 1 in accordance with a representative embodiment showing four rearwardly-facing jet outlets.

FIG. 2 shows is a side cross-sectional view of the head 3 of the nozzle 1 shown in FIG. 1 in accordance with a representative embodiment, with the cross-section being take along line A-A shown in FIG. 3. FIG. 3 shows a rear perspective view of the head 3 of the nozzle 1 shown in FIG. 1 in accordance with a representative embodiment showing the removable threaded inserts 17*a*-17*d* that are removably secured to the respective rearwardly-facing jet outlets 11*a*-11*d*, respectively, as well as the removable threaded insert 18 that is removably secured to the forwardly-facing jet outlet 13.

Figure 4:
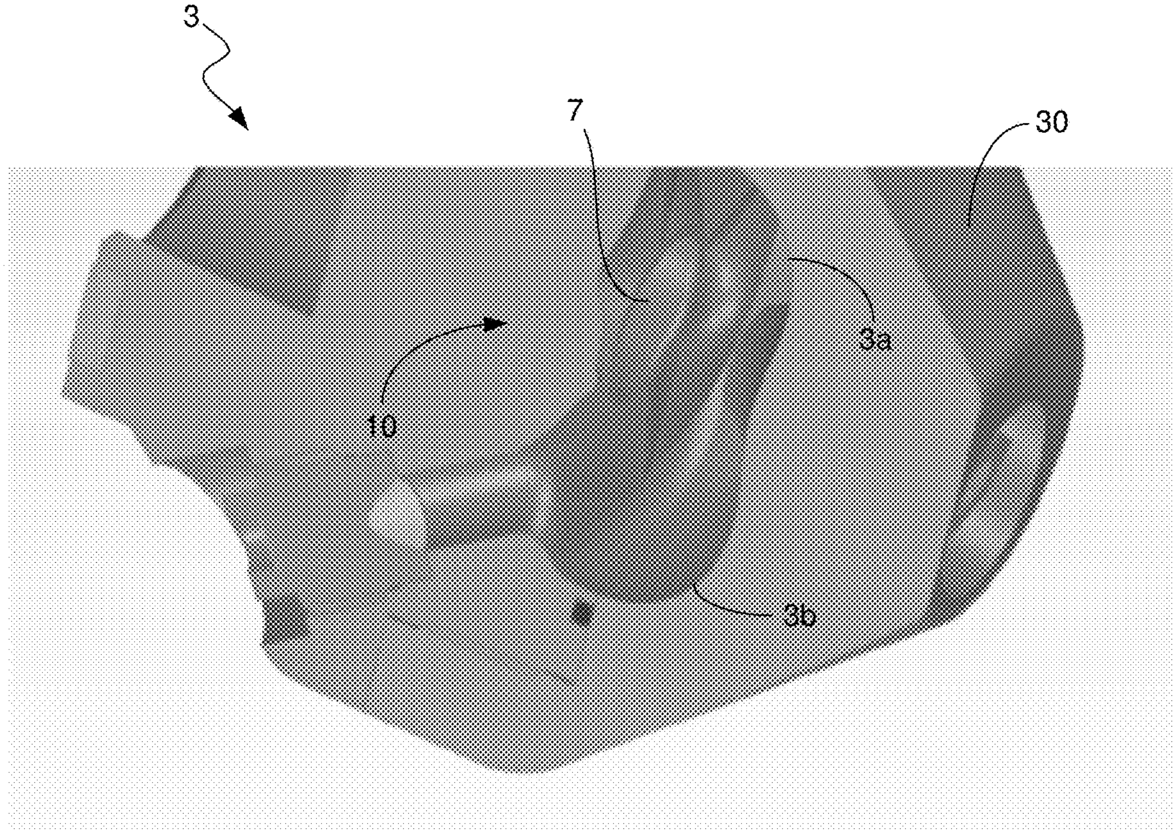
FIG. 4 shows a side cross-sectional view of the head shown in FIGS. 1-3 in accordance with a representative embodiment showing a portion of the 3-D fluid redirection configuration that redirects water received in the head toward the four rearwardly-facing jet outlets shown in FIG. 3.

FIG. 4 is a side cross-sectional view of the head 3 shown in FIGS. 1-3 in accordance with a representative embodiment showing a portion of the 3-D fluid mechanics 10 that redirects fluid (e.g., water) received in the head 3 toward the four rearwardly-facing jet outlets 11*a*-11*d* shown in FIG. 3. Only two of the fluid diversion chambers 3*a* and 3*b* of the 3-D fluid mechanics 10 can be seen in the side cross-sectional view of FIG. 4.

With reference to FIGS. 1 and 2, a bearing 16 formed in the head 3 is configured to receive the shaft 15 (FIG. 1) of the nozzle body 2 in a rotational coupling configuration (e.g., a ball bearing coupling configuration) to rotatably couple the head 3 to the body 2. In accordance with this embodiment, a sealing ring 4 is disposed in between the head 3 and the body 2 at the location where they are coupled together such that once the shaft 15 and the bearing 16 have been coupled together, a water-tight seal exists between the body 2 and the head 3.

As can best be seen in FIG. 2, in accordance with a preferred embodiment, the head 3 is a two-piece part configuration comprising a first part 20 and a second part 30 that are coupled together. The first part 20 of the head 3 interfaces with the nozzle body 2 and has the four rearwardly directing fluid channels 9*a*-9*d* formed therein and a second part 30 that comprises the four fluid diversion chambers 3*a*-3*d*, although only rearwardly-facing fluid channel 9*b* is visible in FIG. 2. In accordance with a representative embodiment, the first and second parts 20 and 30, respectively, have interfacing (e.g., threaded) surfaces 20*a* and 30*a*, respectively, that are complementary in shape to allow them to mate with one another in an interlocking, water-tight relationship. Alternatively, the first and second parts 20 and 30, respectively, can be coupled together by some other suitable fastening mechanism, such as welding, soldering, adhesive, etc.

Making the head 3 as a two-part configuration is advantageous because it allows the fluid diversion chambers 3*a*-3*d* to be very precisely formed to include rounded features that more gently redirect the incoming fluid onto the rearwardly directing fluid channels 9*a*-9*d*. This feature reduces the aforementioned vibrations in the nozzle 1 that can lead to performance degradation and other problems. During manufacturing of the second part 30, the rounded fluid diversion chambers 3*a*-3*d* are formed by a suitable process, such as by machining or molding, for example.

The cross-sectional view of FIG. 4 shows portions of the rounded features comprising the fluid diversion chambers 3*a* and 3*b* for redirecting the incoming fluid onto one of the rearwardly directing fluid channels 9*a* and 9*b*, respectively. In accordance with a representative embodiment, the rounded features are semi-spherical or hemispherical in shape and are concave relative to the direction of the incoming fluid propagating along the main channel 7 of the head 3 toward the 3-D fluid mechanics 10. The rounded features preferably are curved in three dimensions and preferably are partial spheres, although they can be aspherical. The inventive principles and concepts are not limited to the rounded features having any particular geometrical shape, but they are precisely formed to ensure that they direct fluid passing out of the main channel 7 of the head 3 onto the respective fluid channels 9*a*-9*d* in a smooth manner that reduces vibrations in the head 3.

Many modifications may be made to the embodiments described herein while still achieving the goals of the invention, and all such modifications are within the scope of the invention. For example, although embodiments described herein depict the head 3 having an N=4 configuration, i.e., N fluid diversion chambers, N rearwardly directing fluid channels and N rearwardly-facing fluid jet outlets, N can be any integer that is greater than or equal to one.

It should be noted that the illustrative embodiments have been described with reference to a few embodiments for the purpose of demonstrating the principles and concepts of the invention. Persons of skill in the art will understand how the principles and concepts of the invention can be applied to other embodiments not explicitly described herein. For example, while a particular configuration of the nozzle 1 is described herein and shown in the figures, a variety of other configurations such as those mentioned above can be used, as will be understood by those skilled in the art in view of the description provided herein. Many other modifications may be made to the embodiments described herein while still achieving the goals of the invention, and all such modifications are within the scope of the invention.

What is claimed is:

1. A nozzle for cleaning pipes, the nozzle comprising:

a nozzle body having first and second ends, the second end being configured to be attached to a fluid source that delivers a flow of fluid to the nozzle, the nozzle body having a first main fluid channel and the nozzle body being stationary relative to a nozzle head and adapted to allow fluid passing out of the fluid source to flow through the nozzle body in a forward direction of the nozzle and out of the first end of the nozzle body;

the nozzle head having a first end and a second end, the first end of the nozzle head being rotatably coupled with the first end of the nozzle body via a rotational coupling configuration in which the nozzle head is rotatable about the first main fluid channel, the nozzle head having a plurality of fluid channels and a plurality of respective fluid jet outlets disposed therein, wherein N of the fluid channels and N of the fluid jet outlets are rearwardly-facing fluid channels and rearwardly-facing fluid jet outlets, respectively, where N is a positive integer that is greater than or equal to two, wherein a second main fluid channel of the nozzle head is arranged in the nozzle head such that fluid passing out of the first end of the nozzle body enters the second main fluid channel of the nozzle head, flows in the forward direction of the nozzle toward the second end of the nozzle head and passes out of a second end of the second main fluid channel of the nozzle head;

three-dimensional (3-D) fluid mechanics disposed in the nozzle head that are configured to receive fluid passing out of the second end of the second main fluid channel of the nozzle head and to direct the received fluid onto the fluid channels toward respective fluid jet outlets, the 3-D fluid mechanics comprising a 3-D fluid redirection configuration comprising N fluid diversion chambers upon which at least a portion of the fluid received by the 3-D fluid mechanics is incident, the N fluid diversion chambers being configured to redirect the fluid that is incident thereon onto the N rearwardly-facing fluid channels toward the N rearwardly-facing fluid jet outlets respectively, to generate N rearwardly-directed fluid jets, respectively; each of the N fluid diversion chambers comprises a respective rounded feature, each rounded feature is curved in three dimensions such that each rounded feature gently redirects incoming fluid onto a respective rearwardly directing fluid channel, each rounded feature reducing vibrations in the nozzle during fluid flow; and the N rearwardly-directed fluid jets rotating the nozzle head about the rotational coupling configuration and the first main fluid channel.

2. The nozzle of claim 1, wherein each of the rounded features is a partial sphere.

3. The nozzle of claim 1, wherein each of the rounded features is aspherical in shape.

4. The nozzle of claim 1, wherein said plurality of fluid channels and said plurality of respective fluid jet outlets further comprise at least one forwardly-facing fluid channel and at least one forwardly-facing jet outlet, respectively, and wherein at least a portion of the fluid received by the 3-D fluid mechanics is directed by the 3-D fluid mechanics onto the forwardly-facing fluid channel toward the respective forwardly-facing fluid jet outlet to generate a respective forwardly-directed fluid jet.

5. The nozzle of claim 1, wherein the nozzle head comprises two main piece parts that are interlocked with one another to form the nozzle head, the main fluid channel of the nozzle head extending through the first piece part, the first piece part comprising the first end of the nozzle head that is coupled with the first end of the nozzle body, said N rounded features being disposed in the second piece part.

6. The nozzle of claim 1, wherein N is greater than or equal to four such that at least four rearwardly-directed fluid jets and at least one forwardly-directed fluid jet are generated.

* * * * *